United States Patent [19]
Powell et al.

[11] Patent Number: 6,071,048
[45] Date of Patent: Jun. 6, 2000

[54] PREFORM GATE CUTTER

[75] Inventors: Theron Powell; James Gooch, both of Pearl; Ronnie Naramore, Brandon; Robert Johnson, Jackson; Paul Donald; Billy Donald, both of Pearl; Jamie Farris, NE. Brookhaven, all of Miss.

[73] Assignee: Crown Cork & Seal Technologies Corporation, Alsip, Ill.

[21] Appl. No.: 09/204,100

[22] Filed: Dec. 1, 1998

[51] Int. Cl.[7] ................................................ B23C 3/00
[52] U.S. Cl. ........................... 409/131; 408/1 R; 408/54; 408/62; 408/87; 408/103
[58] Field of Search ..................... 409/138, 139, 409/140, 131, 132; 82/113; 408/1 R, 54, 62, 63, 65, 67, 87, 103, 104, 109

[56] References Cited

U.S. PATENT DOCUMENTS

| | | | |
|---|---|---|---|
| 2,077,266 | 4/1937 | Rochte | 408/87 |
| 2,545,782 | 3/1951 | Hugin | 33/143 |
| 2,717,011 | 9/1955 | Phinn | 408/62 |
| 3,489,040 | 1/1970 | Westhoff | 408/62 |
| 3,693,075 | 9/1972 | Förster | 324/40 |
| 3,863,351 | 2/1975 | Kalen | 33/169 R |
| 3,913,234 | 10/1975 | Windle | 33/147 E |
| 4,633,590 | 1/1987 | Lagasse | 33/148 R |
| 5,415,670 | 5/1995 | Schmidt | 409/140 |
| 5,419,056 | 5/1995 | Breitenstein | 33/550 |
| 5,649,464 | 7/1997 | Gracey | 408/87 |
| 5,653,934 | 8/1997 | Brun, Jr. et al. | 264/334 |
| 5,727,295 | 3/1998 | Gracey | 82/113 |
| 5,744,088 | 4/1998 | De Cuyper | 264/297.2 |
| 5,772,951 | 6/1998 | Coxhead et al. | 264/537 |
| 5,788,429 | 8/1998 | Gracey | 408/87 |
| 5,840,350 | 11/1998 | Salemi | 425/533 |
| 5,876,157 | 3/1999 | Wethered | 408/104 |

FOREIGN PATENT DOCUMENTS 0 536 626 A1  4/1993  European Pat. Off. .
2304429  10/1976  France .................. 408/103

OTHER PUBLICATIONS

Magna–Mike® Model 8000 Instruction Manual, Manual No. 910–088F, Panametrics, May 1, 1993.

*Primary Examiner*—Daniel W. Howell
*Attorney, Agent, or Firm*—Woodcock Washburn Kurtz MacKiewicz & Norris LLP

[57] ABSTRACT

A preform gate cutter for cutting a hole in a preform gate includes a cutter, a housing forming a cutting chamber, and a preform chuck having a longitudinal preform bore for receiving a preform. The preform chuck is insertable into a housing bore. The preform chuck defines a centerline that is coincident with the preform centerline and is aligned with a perimeter of the cutter to enable the cutter to form a hole in the preform at the preform gate. The housing may have a cutting chip discharge slot. A method for cutting a hole at the preform gate is also provided.

16 Claims, 5 Drawing Sheets

PREFORM GATE CUTTER

FIELD OF THE INVENTION

The present invention relates to cutting tools, and more particularly to an apparatus for cutting a plastic preform at the preform gate for inspection.

BACKGROUND OF THE INVENTION

Blow molding is a common process for forming plastic bottles and similar containers. The blow molding process typically includes heating and pressurizing the interior of a plastic preform inside a mold to expand the preform to the shape of the mold. Preforms are often formed of a thermoplastic, for example HDPE or PET, by injection molding, extrusion, or a combination of both methods.

Blow molding process include injection blow molding and extrusion blow molding, each of which generally correspond to the method of forming the preform. The injection blow molding process typically conveys, mixes, melts, and injects resin into an injection mold, often using a screw conveyor. The extrusion blow molding process may be continuous, in which molds move around the preform and then move away from the extruder, or intermittent in which the extruder intermittently pushes the extrusion in a mold similar to injection blow molding.

A typical preform 92, of the type that may be blown into a plastic bottle, is shown in FIG. 9 (prior art). Preform 92 includes an open end 94a, a substantially cylindrical body 95, and a rounded tip 97 at a closed end 94b, which is opposite the open end. The open end 94a may have screw threads 93 formed near its neck, and a neck support ring 93, which forms the largest diameter of the preform. Support ring 93 forms a shoulder 91 that includes a flat surface that faces closed end 94b. At the end of the rounded tip 97 is the gate 99, which is typically an oblate ball shape.

Preform design and production quality is crucial to forming a blow-molded container having sound physical properties. Further, because each final container design requires its own unique preform shape, quality control measures often must be modified to accommodate each preform. A critical area of quality in preform production is the integrity of the gate area. Defects in the gate area may create a defective container or cause related structural or process problems.

Defects that may occur at the preform gate include crystal penetration, excavation, and voids. Crystal penetration occurs when the plastic (most often PET) that forms the gate area is improperly heated or cooled during forming of the preform such that the plastic has a partial crystalline form, rather than the desired amorphous form. Crystal penetration causes a lack of elasticity, which may cause the container to shatter during the blow molding process. Excavation occurs often by overheating during forming of the preform, and manifests as sinks or pits in the surface of the gate. The sinks may cause the container to burst during blow molding. Voids are similar to excavations, except that voids are not on the surface of the preform, but rather are encapsulated by the plastic of the gate. Voids may also cause the container to burst during blow molding.

Without adequate inspection, gate defects may result in large amounts of improperly formed preforms and containers. Prompt gate inspection and detection of defects are especially important in mass production circumstances so that process parameters may be promptly adjusted to correct the defects. Unfortunately, detection of gate defects is difficult, especially from an external inspection of the gate.

SUMMARY OF THE PRESENT INVENTION

According to an aspect of the present invention, an apparatus for forming a hole in the preform gate to enable inspection of the gate area is provided. The apparatus comprises a preform chuck that has a preform chuck surface formed by a bore for securing the preform. The preform is insertable into the bore and may be securely held therein.

A cutter or cutting tool for cutting the preform gate is aligned with a portion of the preform chuck. The cutter has a body or shank, which is clamped into a cutter chuck, and a tip that is capable of forming a hole in plastic. A motor drives the cutter, and includes a rotor and a frame. The longitudinal centerlines of the cutter and the preform bore (and therefore the preform) preferably are parallel but not co-linear. Rather, the centerlines are spaced apart such that the periphery of the cutter intersects the centerline of the preform bore. Thus, the cutter can form in the preform a hole, the perimeter of which intersects the center of the preform gate.

The apparatus may include a housing that forms a cutting chamber that surrounds the cutter tip. The housing has a longitudinal bore capable of receiving the preform chuck, as well as a longitudinal counterbore opposite the housing bore. The housing bore and counterbore communicate within the interior of the housing. Transverse holes may be formed in the housing to receive plugs or set screws that correspond to longitudinal flats formed on the preform chuck. The plugs and screws may be inserted through the transverse holes and force against the chuck flats to clamp the preform chuck to the housing. The housing preferably includes a horizontal support plate to which the motor frame may be bolted.

According to another aspect of the present invention, the preform gate cutter apparatus may be combined with additional preform chucks. Each of the additional preform chucks may have a unique bore to accommodate preforms of various unique sizes. Each of the additional chucks have a similar outer diameter on a shank portion (that is, the portion that is insertable into the housing bore) so that it may be interchangeable with respect to the housing bore. Thus, the apparatus may be used for a wide variety of preform sizes.

The present invention encompasses a method for enabling inspection of a preform gate. The method includes rotating a cutter that is disposed within a cutting chamber within a housing; aligning a centerline of a preform chuck with a perimeter of the cutter; inserting a preform into the preform chuck; urging the preform and the cutter together; cutting a hole in the preform though the preform gate by the cutter; and inspecting the preform gate.

The apparatus and method enable inspection of the preform gate for defects, for which other inspection methods are deficient. For example, cutting a preform proximate the gate with a scissor-like plastic-pipe cutter or a sharp knife may compress voids or excavations such that they are difficult to detect, especially when the preform is hot, and may shatter the preform, especially when the preform is cold. Cutting at the appropriate cutting speed and with the appropriate blade exposes voids, excavations, and crystal penetrations that may otherwise be impossible or difficult to detect. Further, the apparatus and method eliminate the safety problems associated with manual cutting methods, such as potential eye injury caused by flying plastic debris, bodily injury caused by a sharp cutting tool slipping off the preform, and related injuries.

DETAILED DESCRIPTION OF PREFERRED EMBODIMENTS

Figure 1:
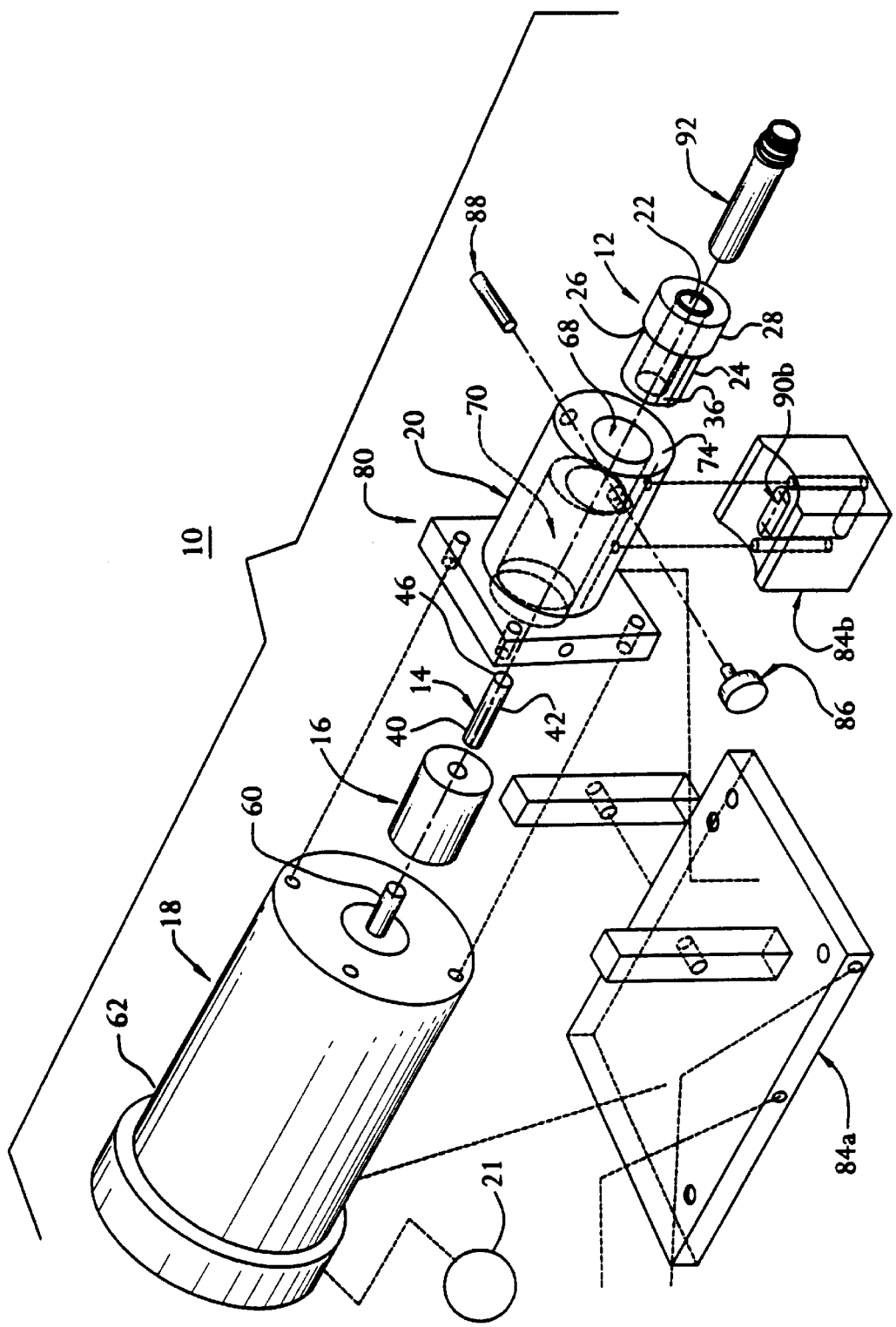
FIG. 1 is an exploded view of the present invention.
Figure 2:
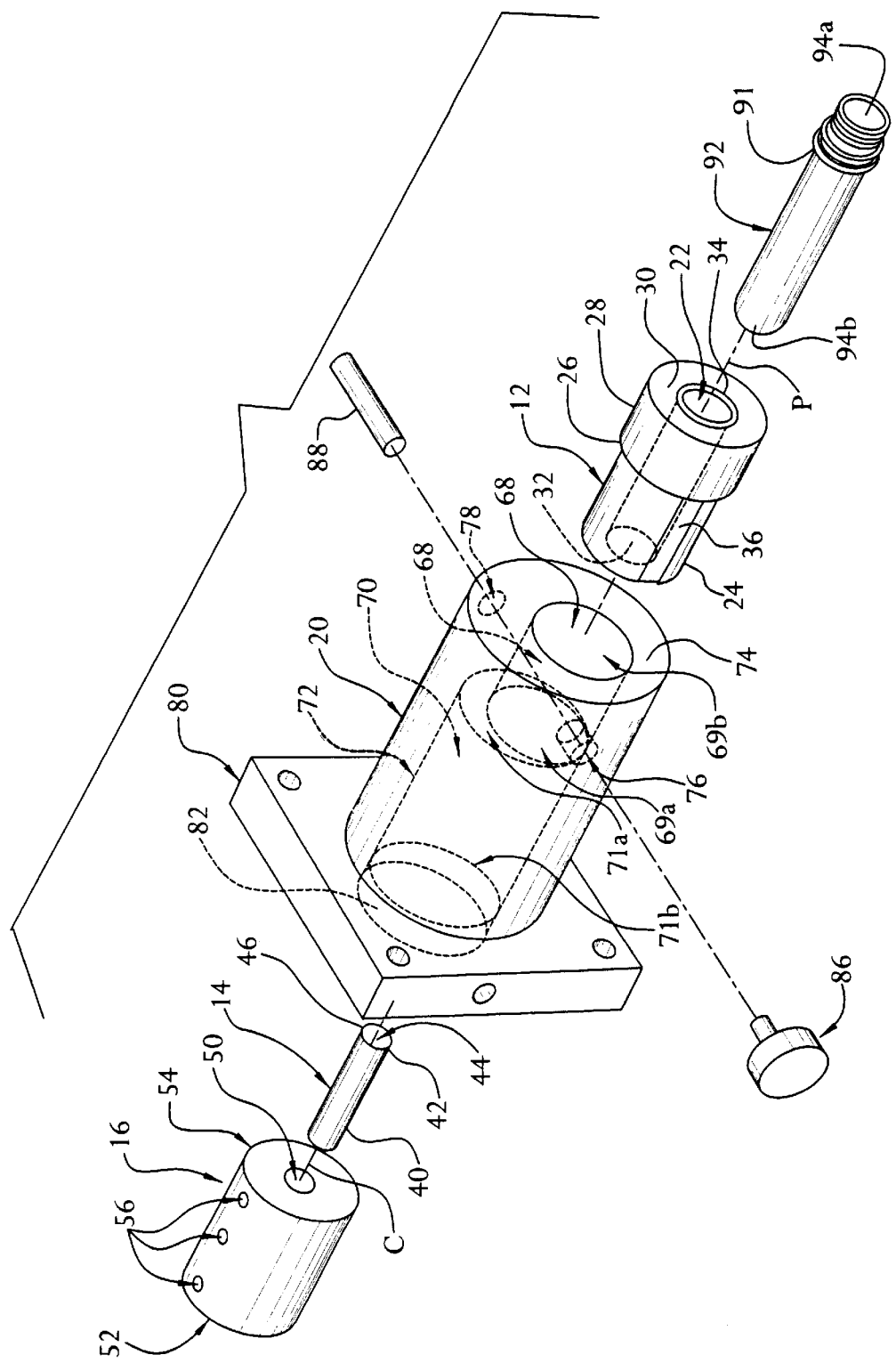
FIG. 2 is an enlarged exploded view of a portion of the present invention.
Figure 9:
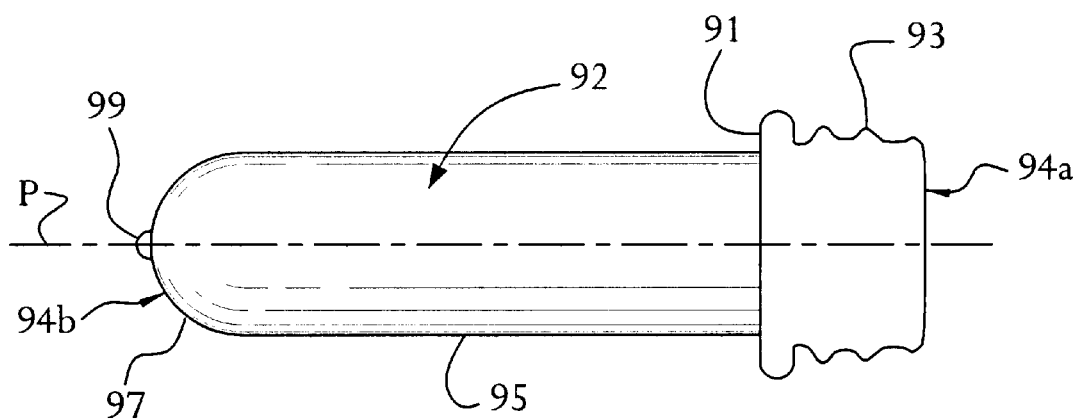
FIG. 9 (prior art) is a view of the preform.
Figure 10:
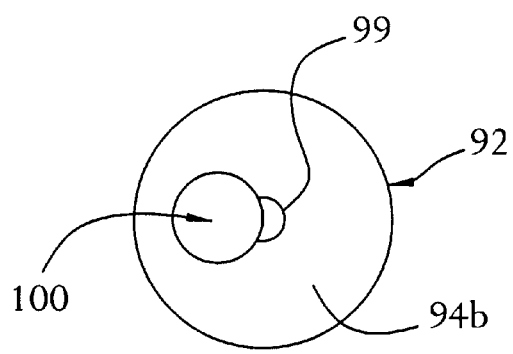
FIG. 10 is an enlarged end view of the preform on which the invention has been employed.

According to an embodiment of the present invention, an apparatus 10 for accurately and repeatably cutting a preform at its gate is provided. Referring particularly to FIGS. 1 and 2, the apparatus includes a perform chuck 12, a cutter 14, a cutter chuck 16, a motor 18, and a housing 20. The present invention encompasses preform 92, generally shown in FIG. 9, of the type that the present invention may employ. Preform 92 is also shown in FIGS. 1, 2, and 10. Further, the apparatus 10 encompasses an electrical interlock 21, shown schematically in FIG. 1, that may be depressed continuously by one hand of an operator in order for motor 18 to run.

Figure 6:
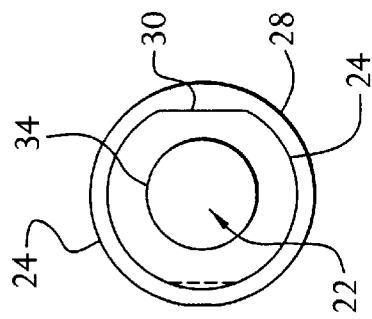
FIG. 6 is an end view of the preform chuck shown in FIG. 5.
Figure 5:
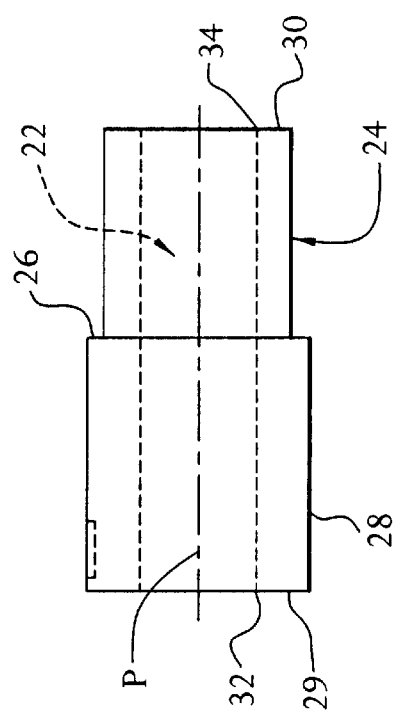
FIG. 5 is an enlarged side view of an embodiment of the preform chuck according to an aspect of the present invention.

Referring specifically to FIGS. 2, 5, and 6 to illustrate an aspect of the present invention, preform chuck 12 includes a preform bore 22, a body 24, a shoulder 26, a head 28, a rear face 29, a front face 30, a rear rim 32, a front rim 34, and a flat portion 36. Preform chuck 12 defines a longitudinal centerline P. Body 24 and head 28, both of which preferably are cylindrical and concentric about centerline P, are opposing to form the ends of preform 12. Because body 24 has a smaller outer diameter than head 28, shoulder 26 is formed therebetween. Flat 36 is disposed on one side of body 24, preferably along its entire length. FIG. 6 shows a second flat 38 that is disposed opposite flat 36, and is shown in relief to indicate that it is optional.

Bore 22 is formed through body 24 and head 28. Bore 22 defines a longitudinal centerline that is co-linear with centerline P. Rear face 29, which is formed on the end face of body 28, meets bore 22 at rear rim 32. Front face 30, which is formed on the end face of head 28, meets bore 22 at front rim 34. Bore 22 has a smooth, preferably polished finish. Although centerline P is defined with respect to bore 22, centerline P is also defined as the centerline of preform 92 such that centerline P passes through the center of gate 99. Although body 24 and head 28 preferably are cylindrical and concentric about centerline P, the present invention encompasses any shape of the body and head that match with a corresponding shape of housing 20, including ovals, squares, rectangles, and others that will be apparent by persons familiar with such devices. Preform chuck 12 may be machined from aluminum.

Figure 8:
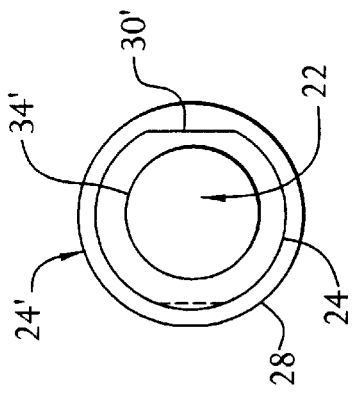
FIG. 8 is an end view of the preform chuck shown in FIG. 7.
Figure 7:
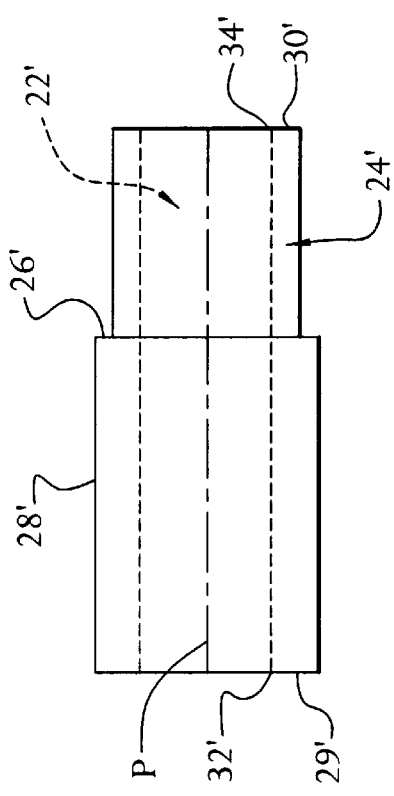
FIG. 7 is an enlarged side view of another embodiment of the preform chuck according to the present invention.

Referring to FIGS. 7 and 8 to illustrate another aspect of the present invention, another preform chuck 12' is provided. Preform chuck 12' includes a preform bore 22', a body 24', a shoulder 26', a head 28', a rear face 29', a front face 30', a rear rim 32', a front rim 34', and a flat portion 30'. Body 24', shoulder 26', head 28', rear face 29', front face 30', rear rim 32', front rim 34', and flat portion 30' are substantially the same as corresponding portions described with reference to chuck 12 and FIGS. 5 and 6. However, bore 22' has a diameter that is different from bore 22 of chuck 12. Thus, preform chuck 12' may be used to clamp preforms of a different size than those clamped by preform chuck 12. Preform chucks 12 and 12' (and additional chucks of unique sizes that are not shown) are otherwise interchangeable with housing 20 to enable the present invention to be employed with a wide variety of preform sizes.

Cutter 14 has a shank 40, a cutting face 44, and a cutting rim 46. Shank 40 has a cylindrical or polygon (for example, hexagonal) shape to provide a surface to be securely disposed in cutter chuck 16. At the distal end from cutter chuck 16, cutter face 44 is disposed on the end face of cutter 14. Cutter 14 may be the type used in routers that form a flat bottomed hole. Thus, cutting face 44 may include cutting blades 42. The perimeter of cutting face 44 forms cutting rim 46, which is capable of forming the hole diameter. The present invention broadly encompasses cutters of types other than described above. Specifically, cutter 14 may be a standard tapered drill bit or any other conventional drill bit, router bit, or similar tool. Cutter 14 defines a longitudinal centerline C.

Referring to FIG. 2, motor 18 includes a rotor 60 and a frame 62. Rotor 60 is sized and designed to mate with cutter chuck 16. Motor 18 may be an electric, hydraulic, pneumatic motor, or other conventional type, and may be variable or fixed speed. Preferably, motor 18 has studs (not shown) or holes to receive hold-down bolts (not shown) in its front face such that motor 18 may mate to a vertical support plate 80. Frame 62 may be further supported.

The speed of motor rotation may be chosen in conjunction with the style and size of cutter 14. Such parameters may also depend on preform diameter and thickness, gate design, preform temperature, particular type of defect to which inspection may be directed, and similar variables as will be understood by persons familiar with preforms and their manufacture and inspection.

Cutter chuck 16 includes a cutter chuck bore 50, a motor end 52, a cutter end 54, and plural clamping holes 56. Bore 50 is sized to receive the motor rotor 60 at motor end 52, and to receive cutter shank 40 at cutter end 54. Clamp holes 56 are formed from the periphery of chuck 16 to bore 50 to enable set screws (not shown) or similar fasteners to removably affix cutter chuck 16 to cutter 14 and motor 18. The present invention encompasses cutter chucks of any conventional type.

Figure 4:
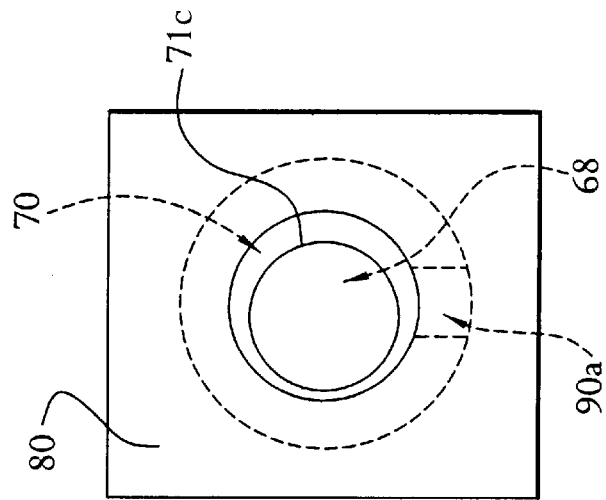
FIG. 4 is an end view of the housing shown in FIG. 3.
Figure 3:
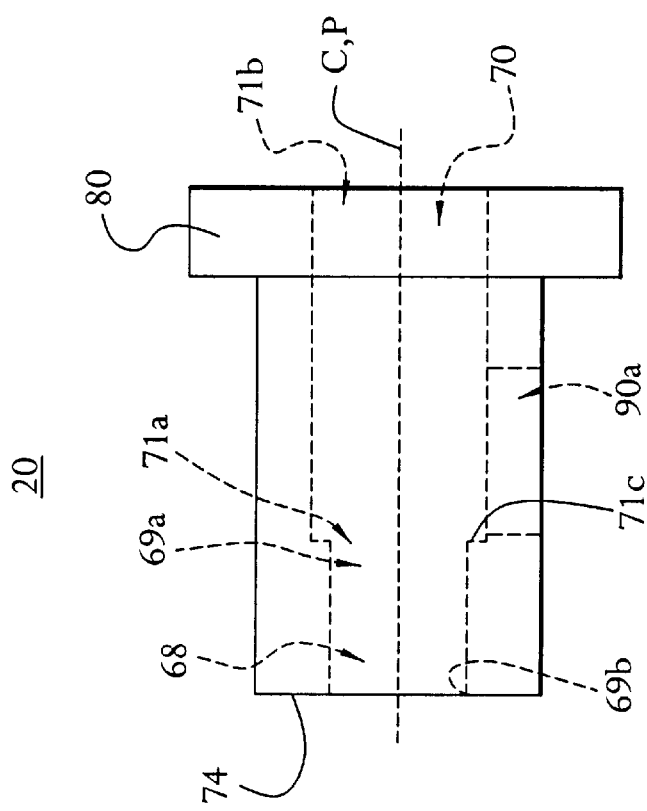
FIG. 3 is an enlarged side view of the housing according to an aspect of the present invention.

Referring to FIGS. 2, 3, and 4 to illustrate to an aspect of the present invention, housing 20 includes a housing bore 68, a housing counterbore 70, an outer face 74, a first transverse hole 76, and a second transverse hole 78. Transverse holes 76 and 78 are omitted for FIGS. 3 and 4 for clarity. Housing 20 preferably has an outer cylindrical shape, through which bore 68 and counterbore 70 are longitudinally formed. Neither bore 68 nor counterbore 70 extend fully longitudinally through housing 20, but bore 68 and counterbore 70 meet within housing 20. Thus, bore 68 forms an interior end 69a and an exterior end 69b, and counterbore 70 forms an interior end 71a and an exterior end 71b. Preferably bore 68 and counterbore 70 form a shoulder 71c between interior ends 69a and 71a, as shown in FIGS. 3 and 4. Counterbore 70 is preferably formed on a first or rear end face of housing 20, and is concentric with a centerline C. Thus, motor rotor 60, cutter chuck 16, cutter 14, and (optionally) counterbore 70 each define centerlines that are substantially co-linear with centerline C.

Bore 68 is formed in outer face 74 (that is, a second or front end face) of housing 20, and is sized to receive body 24 of preform chuck 12. Bore 68 defines a centerline that is co-linear with preform chuck bore centerline P. Interior end 69a of bore 68 (that is, the end opposite outer face 74) meets interior end 71a of counterbore 70 to provide a continuous longitudinal opening through housing 20.

Housing 20 has a means to clamp preform chuck 12 into bore 68, such as transverse holes 76 and 78, which preferably are disposed on opposite sides of housing 20 through the wall to connect to bore 68. Transverse hole 76 has internal threads to receive a set screw 86, which preferably includes a knob to facilitate clamping of preform chuck 12. Set screw 86 urges against flat 36 of preform chuck 12 to clamp preform chuck 12 against bore 68. Transverse hole 78 is capable of receiving a freeze plug 88, which preferably is formed of steel.

Preferably, housing 20 is affixed, and even more preferably integrally formed with, support plate 80, both of which may be machined from aluminum. Support plate bore 82 is integrally formed with housing counterbore 70 to form a cutting chamber. Preferably, support plate 80 is vertical and is capable of fastening to motor 16, preferably by bolting. Although the cutting chamber is described in this embodiment as including housing counterbore 70 and support plate counterbore 82, the cutting chamber may contain only housing counterbore 70 in embodiments that lack support plate 80, and may include both counterbore 70 and housing bore 68.

Referring to FIGS. 1, 2, 3, and 4 to illustrate another aspect of the present invention, preform chuck bore centerline P is preferably not co-linear with cutter centerline C. Centerlines P and C are preferably parallel (that is, co-planar) and spaced apart to align the perimeter of cutter 14—specifically, the perimeter of cutter rim 46—with preform chuck centerline P. Therefore, a hole formed by cutter 14 in preform 92 will have an edge that coincides with the center of the gate, as shown in FIG. 10. Although FIG. 10 shows hole 100 sized as a particular size, the present invention is not limited thereto. Specifically, the diameter of hole 100 will be chosen according to parameters such as preform diameter, thickness, and temperature, and desired inspection goals.

Referring to FIG. 1, a base plate 84a and a saddle 84b may be employed. Based plate 84a includes bolt holes or studs to support vertical support plate 80 and a surface to support motor frame 62. Saddle 84b may be supported on base plate 84a, or may be independent of plate 84a. Saddle 84b preferably has a saddle surface to receive and support the cylindrical portion of housing 20. Referring to FIGS. 1 through 4, a chip discharge slot 90a may be formed at the bottom of housing 20 from its exterior to counterbore 70. A corresponding chip discharge slot 90b may be formed in saddle 84b such that slots 90a and 90b align when housing 20 is supported by saddle 84b. Chip discharge slots 90a and 90b provide a space for preform cutting chips created by cutter 14. Chip discharge slot 90b may be formed through the bottom of saddle 84b, which may be supported on another base (not shown) having a corresponding opening such that preform cutting chips may fall therethrough.

Referring to FIG. 2 to illustrate another embodiment of the present invention, cutter chuck 16 may comprise an actuator that is capable of moving cutter 14 horizontally to engage a stationary preform 92. In this embodiment, preform 92 may be inserted into preform chuck 12, which is inserted and clamped into housing 20, while cutter 14 is in a retract position. The cutting chamber is sized to accept preform 92 while cutter 92 is in the retracted position. The actuator may be sized to bring cutter 14 into contact with a wide variety of lengths of preform 92.

The operation of apparatus 10 will be described in conjunction with a description of the method according to the present invention. Apparatus 10 is assembled with rotor 60 and cutter 14 clamped within cutter chuck 16. Motor 18 is bolted to support plate 80 so that cutting face 44 of cutter 14 is disposed within the cutting chamber formed by counterbore 70. Body 24 of preform chuck 12 is inserted into bore 68 until preform chuck shoulder 26 abuts housing outer face 74. Set screw 86 is tightened in transverse hole 76 until a distal end of set crew 86 urges against flat 36 (and freeze plug 88 may be inserted into transverse hole 78) to securely clamp preform chuck 12 in housing 20.

An operator may engage motor 16 by using a first hand to depress motor interlock 21, which causes cutter 14 to rotate. A first preform 92, of the type described with reference to FIG. 9, is chosen such that the diameter of its body 95 matches that of preform chuck bore 22. Preform 92 is inserted, by the operator's second hand, into bore 22 by inserting closed end 94a into of bore 22 from the front face 30 end. Because the diameters of bore 22 and preform body 95 are closely matched, preform 92 travels smoothly and uniformly into bore 22. First preform 92 is inserted into bore 22 until cutter 14 engages the closed end 94b, specifically at gate 99.

The operator preferably continues to push preform 92 into bore 22 until cutter 14 cuts a hole fully through preform 92, partially through gate 99. Because the periphery of cutter rim 46 is aligned with the centerline P, along which gate 99 travels though bore 22, cutter 14 forms a hole 100 having its periphery cut through a centerline of gate 99, as shown in FIG. 10. The operator may continue to push preform 92 into preform chuck 12 until shoulder 91 of support ring 93 abuts outer face 74 of preform 12 if housing 20 is long enough to receive the entire length of preform 92. The operator may remove preform 92, simultaneous to disengaging motor 18 by releasing interlock 21, for visual or instrument inspection and measurement of preform 92. Hole 100 enables access to the interior of the preform wall and the interior of gate 99 for inspection. A second preform chuck 92' may replace preform chuck 92 to enable cutting and inspecting a second preform having a different diameter from the preform described above.

Alternatively, the preform may be inserted and secured into the preform chuck 12 before chuck 12 is placed into housing bore 68. Preform chuck 12, with preform 92 installed therein, may be inserted into housing 20 while cutter 14 is rotating to form hole 100.

In the embodiment of the invention in which cutter chuck 16 includes an actuator, preform 92 may be loaded into preform chuck 12, which may be installed and clamped into housing 20 with cutter 14 in the retracted position. The operator may rotate cutter and actuate cutter 14 horizontally to bore hole 100 into preform 92 at gate 99.

As will be clear to persons familiar with inspection and cutting machinery, changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims. For example, the chucks and housing described above are described as cylindrical, although other shapes may be employed; various support means may be employed to hold the components; and other changes that will be apparent to persons familiar with rotating machinery and/or preforms and their inspection.

We claim:

1. An apparatus for enabling inspection of a gate area of a preform, comprising:
    a preform chuck, having a preform chuck surface, for removably securing the preform;
    a cutter having a tip for cutting the preform gate, the cutter aligned with a portion of the preform chuck, a periphery of the cutter being aligned with a longitudinal centerline of the preform chuck for cutting a hole having its perimeter intersecting the gate centerline; and
    a motor having a rotor that is operatively coupled to the cutter, the motor capable of rotating the cutter to cut a hole in the preform gate.

2. A method of inspecting a preform having a gate, comprising the steps of:
    rotating a cutter that is disposed within a cutting chamber within a housing;
    aligning a centerline of a preform chuck with a perimeter of the cutter;
    inserting a preform into the preform chuck;
    urging the preform and the cutter together;
    cutting a hole in the preform though the preform gate by the cutter; and
    inspecting the preform gate.

3. The apparatus of claim 1 further comprising a housing having a housing bore and a counterbore formed therein that are in mutual communication, the housing bore having a diameter that matches an outside diameter of a portion of the preform chuck to enable the preform chuck to be insertable therein, the counterbore forming a cutting chamber that surrounds the cutter tip.

4. The apparatus of claim 3 wherein the preform chuck forms a bore therein for securing the preform, the preform chuck surface formed on a surface of the bore, the preform chuck bore capable of removably receiving the preform therethrough.

5. The apparatus of claim 4 wherein the cutter has a flat end face.

6. The apparatus of claim 4 wherein a longitudinal centerline of the preform bore is spaced apart from a longitudinal centerline of the housing bore.

7. The apparatus of claim 4 wherein the preform chuck has a longitudinal flat surface formed therein and the housing comprises a clamp removably pushing on the flat for clamping the preform chuck within the housing bore.

8. The apparatus of claim 7 wherein the clamp comprises at least one of a plug inserted through a transverse bore formed in the housing and a set screw inserted through a threaded transverse bore formed in the housing.

9. The apparatus of claim 4 further comprising a structural plate, each one of the motor frame and the housing coupled to the structural plate.

10. The apparatus of claim 4 further comprising a cutting chip discharge area formed in the housing.

11. The apparatus of claim 4 wherein the preform chuck comprises a first preform chuck that is interchangeable with a second preform chuck, the first preform chuck and the second preform chuck having matching outside diameters, the first preform chuck bore having a different size than the second preform chuck bore.

12. An apparatus for enabling inspection of a gate area of a preform, comprising:
    a preform;
    a preform chuck forming a bore therein for securing the preform;
    a cutter having a tip for cutting the preform gate, the cutter aligned with a portion of the preform;
    a motor having a rotor that is operatively coupled to the cutter, the motor capable of rotating the cutter to cut a hole in the preform gate;
    a housing having a housing bore and a counterbore formed therein that are in mutual communication, the preform chuck insertable into the housing bore, the counterbore forming a cutting chamber that surrounds the cutter tip.

13. An apparatus for cutting a hole in the gate of a preform, comprising:
    a housing having a bore and a counterbore longitudinally formed therein, the bore and the counterbore in mutual communication;
    a cutter disposed within the counterbore capable of cutting a hole in a preform gate, the cutter defining a cutter centerline and a cutter periphery at a cutting end;
    a preform chuck having an outside surface and a longitudinal bore that is capable of removably and slidably receiving the preform, the preform chuck outer surface having a diameter that matches a diameter of the housing bore to enable the preform chuck to be removably inserted in the housing bore, the preform chuck defining a preform chuck centerline that is spaced apart from the cutter centerline at a tip of the cutter and that is aligned with a perimeter of the cutter at the cutter tip;
    whereby the preform chuck centerline is coincident with the preform centerline to enable the cutter to form a hole in the preform such that the hole intersects the preform gate to expose the interior portion of the preform wall within the preform gate.

14. The method of claim 2 further comprising the step of collecting plastic cutting chips from the cutting step in the cutting chamber.

15. The method of claim 2 wherein the step of urging the preform and cutter together comprises moving the preform against a longitudinally stationary cutter.

16. The method of claim 2 wherein the step of urging the preform and cutter together comprises moving the cutter against a stationary preform.

* * * * *